United States Patent Office 3,309,361
Patented Mar. 14, 1967

3,309,361
BENZOXAZEPINES
John Krapcho, Somerset, and Chester F. Turk, Elizabeth, N.J., assignors, by mesne assignments, to E. R. Squibb & Sons, Inc., New York, N.Y., a corporation of Delaware
No Drawing. Filed Dec. 4, 1963, Ser. No. 328,048
9 Claims. (Cl. 260—239.3)

This invention relates to new chemical compounds having valuable therapeutic properties and processes for the preparation thereof.

The therapeutically active compounds of this invention are bases of the general formula I:

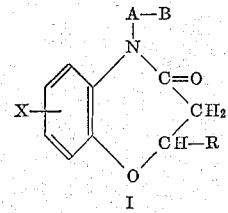

I and the acid-addition salts thereof, wherein X is hydrogen, lower alkyl, lower alkoxy, amino, nitro, halo or trifluoromethyl; R is hydrogen, lower alkyl, an X-substituted phenyl lower alkyl, an X-substituted phenyl, furyl, thienyl, pyridyl or piperonyl; A is lower alkylene (preferably ethylene and propylene); and B is a basic nitrogen-containing radical of less than twelve carbon atoms. Among the suitable radicals represented by the symbol B are: compounds of the formula

wherein R' is hydrogen, lower alkyl hydroxy-lower alkyl, lower alkenyl (e.g., allyl and methallyl), lower alkynyl (e.g., propargyl) and phenyl(lower alkenyl) (e.g., cinnamyl), and R" is hydrogen, lower alkyl, cycloalkyl-(lower alkyl) (e.g., cyclopropylmethyl), hydroxy-lower alkyl, X-substituted phenyl, X-substituted phenyl(lower alkyl), X-substituted phenyl(lower alkenyl), X-substituted benzoyl(lower alkyl), X-substituted phenoxy(lower alkyl), pyridyl and pyridyl(lower alkyl); and saturated 5 to 7 membered monocyclic heterocyclic radicals of less than twelve carbon atoms, as exemplified by piperidino; homopiperidino; (lower alkyl)piperidino; di(lower alkyl)piperidino; (lower alkoxy)piperidino; 2, 3 or 4-piperidyl; 2, 3 or 4-(N-lower alkyl-piperidyl); pyrrolidino; (lower alkyl)pyrrolidino; di(lower alkyl)pyrrolidino; (lower alkoxy)pyrrolidino; 2 or 3-pyrrolidyl; 2 or 3-(N-lower alkyl-pyrrolidyl); morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; homopiperazino; N⁴-R"-piperazino, such as (lower alkyl)piperazino (e.g., N⁴-methylpiperazino) and N⁴-cinnamylpiperazino; di(lower alkyl)piperazino; (lower alkoxy)piperazino; (lower alkanoyl-lower alkyl)piperazino; and (hydroxy-lower alkyl)piperazino (e.g., N⁴-hydroxyethyl-piperazino). The terms "lower alkyl," "lower alkoxy," and "lower alkylene," as employed herein, include both straight and branched chain radicals of less than eight carbon atoms. The particularly preferred compounds are those wherein X is hydrogen or chloro, R is phenyl, A is ethylene or propylene and B is di(lower alkyl)amino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g. hydrochloric and hydrobromic acid), sulfuric acid, nitric acid, boric acid and phosphoric acid, and organic acids such as oxalic, tartaric, citric, acetic and succinic acid, theophylline and 8-chlorotheophylline.

The compounds of this invention and the acid-addition salts thereof, are therapeutically active compounds which are utilizable as analgetic agents. Thus, the compounds of this invention can be administered perorally in the same manner as codeine and meperidine in the treatment of pain, the dosage for such treatment being adjusted for the activity of the particular compound employed.

The compounds of this invention can be prepared by condensing new compounds of the formula II:

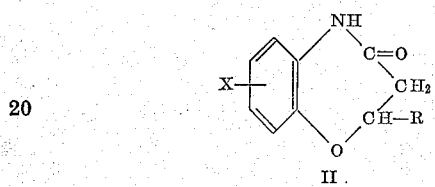

II wherein X and R are as hereinbefore defined, with an aminoalkyl halide of the formula B—A—Y, wherein B and A are as hereinbefore defined and Y is halide, particularly chloride or bromide. This recation is preferably conducted by heating the reactants in the presence of a basic condensing agent, such as an alkali metal, an alkali metal amide (e.g. sodamide), alkali metal hydride or an alkali metal hydroxide. To form the acid-addition salts, the free base initially formed is interacted with at least one equivalent of the desired acid.

To prepare the starting materials (the compounds of Formula II) a compound of the Formula III:

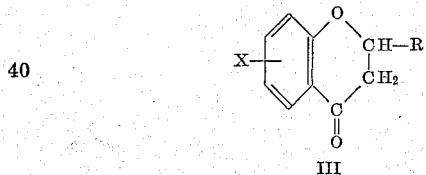

III wherein X and R are as hereinbefore defined, is interacted with hydrazoic acid.

Suitable reactants III include 2,3-dihydro-1,4-benzopyrone; 2-(lower alkyl)-2,3-dihydro - 1,4 - benzopyrones, such as 2-methyl-2,3-dihydro-1,4-benzopyrone and 2-ethyl-2,3-dihydro-1,4-benzopyrone; 2 - (X-substituted phenyl lower alkyl)-2,3-dihydro-1,4-benzopyrones, such as 2-benzyl-2,3-dihydro-1,4-benzopyrone, 2-phenethyl-2,3-dihydro-1,4-benzopyrone, 2-p-tolyl-methyl-2,3-dihydro-1,4-benzopyrone, 2-p-aminobenzyl-2,3-dihydro-1,4-benzopyrone, 2-p-methoxybenzyl-2,3-dihydro-1,4-benzopyrone, 2-m-nitrobenzyl-2,3-dihydro-1,4-benzopyrone, 2-p-chlorophenethyl-2,3-dihydro-1,4-benzopyrone and 2-o-bromobenzyl-2,3-dihydro-1,4-benzopyrone; 2 - (X-substituted phenyl)-2,3-dihydro-1,4-benzopyrones, such as 2-phenyl-2,3-dihydro-1,4-benzopyrone, 2-o-tolyl-2,3-dihydro-1,4-benzopyrone, 2-o-ethoxyphenyl-2,3-dihydro-1,4-benzopyrone, 2-p-chlorophenyl-2,3-dihydro-1,4-benzopyrone, and 2-p-trifluoromethyl-phenyl-2,3-dihydro - 1,4-benzopyrone; 2-α-furyl-2,3-dihydro-1,4-benzopyrone and 2-β-furyl-2,3-dihydro-1,4-benzopyrone; 2-α-thienyl-2,3-dihydro-1,4-benzopyrone and 2-β-thienyl-2,3-dihydro-1,4-benzopyrone; 2-α-pyridyl-2,3-dihydro-1,4-benzopyrone, 2-β-pyridyl-2,3-dihydro-1,4-benzopyrone and 2-γ-pyridyl-2,3 - dihydro-1,4-benzopyrone; 2-piperonyl - 2,3 - dihydro-1,4-benzopyrone; and the 5, 6, 7 and 8-substituted derivatives of any of the above, such as 6-methyl-2,3-dihydro-1,4-benzopyrone, 7- methoxy-2-phenyl-2,3 - dihydro-1,4-benzopyrone, 5-nitro-2-phenyl-2,3-dihydro-1,4-benzopyrone, 6-chloro-2-benzyl-2,3-dihydro-1,4-benzopyrone, and 6-trifluoromethyl-2-phenyl-2,3-dihydro-1,4-benzopyrone.

The following examples illustrate the invention (all temperatures being in centigrade):

EXAMPLE 1

*5-(2-dimethylaminoethyl)-2,3-dihydro-2-phenyl-1,5-benzoxapin-4(5H)-one hydrochloride*

(a) *Preparation of 2,3-dihydro-2-phenyl-1,5-benzoxazepin-4(5H)-one:*

A suspension of 10.0 g. of flavanone and 4.0 g. of sodium azide in 33 ml. of acetic acid is stirred, cooled and treated with 6.6 ml. of concentrated sulfuric acid. The temperature of the mixture is allowed to rise to 45° and maintained at 45–50° for about 45 minutes. After the evolution of nitrogen ceases the mixture is cooled to 30° and poured onto 350 ml. of 10% sodium bicarbonate solution. The mixture is extracted several times with 200 ml. portions of ether and the combined ethereal solution dried over magnesium sulfate. The mixture is filtered and the filtrate evaporated to give about 11.6 g. of oil. The latter is triturated with 500 ml. of hot hexane to give about 4.8 g. of product, M.P. about 122–124°. Crystallization from 25 ml. of acetonitrile gives about 4.1 g. of material, M.P. about 123–125°.

(b) *Preparation of 5-(2-dimethylaminoethyl)-2,3-dihydro-2-phenyl-1,5-benzoxazepin-4(5H)-one, hydrochloride:*

A slurry of 6.0 g. of material from step (a) in 90 ml. of toluene is added to a suspension of 1.0 g. of sodamide in 90 ml. of toluene. The mixture is stirred for 20 minutes at room temperature and then treated with a solution of 4.1 g. of 2-dimethylaminoethyl chloride in 13 ml. of toluene. The mixture is maintained at 80–85° for 6 hours, cooled to room temperature, and the insoluble material is filtered. The filtrate is washed with 25 ml. of water and then extracted with a cold solution of 3.5 ml. of conc. hydrochloric acid in 50 ml. of water. The latter aqueous phase is cooled and treated with a cold solution of 2.5 g. of sodium hydroxide in 10 ml. of water. The liberated base is extracted with 200 ml. portions of ether (three times) and the combined ether phase dried over magnesium sulfate. The mixture is filtered and the filtrate evaporated to give about 3.4 g. of material. The latter is dissolved in 15 ml. of ethanol and treated with 3 ml. of 4 N alcoholic hydrogen chloride and the resulting solution diluted with 25 ml. of ether to give about 3.3 g. of the hydrochloride, M.P. about 182–185°. After crystallization from 15 ml. of acetonitrile, the product weighs about 2.6 g., M.P. about 186–188°.

EXAMPLE 2

*5-(3-dimethylaminopropyl)-2,3-dihydro-2-phenyl-1,5-benzoxazepin-4(5H) hydrochloride*

By substituting 4.9 g. of 3-dimethylaminopropyl chloride for the 2-dimethylaminoethyl chloride in step (b) of Example 1 and then refluxing the mixture for 6.5 hrs., there is obtained about 7.3 g. of base. The latter gives about 7.0 g. of the hydrochloride, M.P. about 205–207°. After crystallization from 75 ml. of acetonitrile, the solid weighs about 5.0 g., M.P. about 206–208°.

EXAMPLE 3

*2,3-dihydro-2-phenyl-5-(2-diethylaminoethyl)-1,5-benzoxazepin-4-one hydrochloride*

Following the procedure used in Example 1 but substituting an equivalent amount of 2-diethylaminoethyl chloride for the 2-dimethylaminoethyl chloride in step (b), the product is obtained.

EXAMPLE 4

*2,3-dihydro-2-phenyl-5-[2-(1-pyrrolidinyl)ethyl]-1,5-benzoxazepin-4-one hydrochloride*

Following the procedure used in Example 1 but substituting an equivalent amount of 2-(1-pyrrolidinyl)-ethyl chloride for 2-dimethylaminoethyl chloride in step (b), the product is obtained.

EXAMPLE 5

*2,3-dihydro-2-phenyl-5-(3-diethylaminopropyl)-1,5-benzoxazepin-4-one hydrochloride*

Following the procedure used in Example 1 but substituting an equivalent amount of 3-diethylaminopropyl chloride for 2-dimethylaminoethyl chloride in step (b), the product is obtained.

EXAMPLE 6

*2,3 - dihydro - 2 - phenyl - 5 - [2(N-methyl-N-phenethylamino)ethyl]-1,5-benzoxazepin-4-one hydrochloride*

Substitution of an equivalent quantity of 2-(N-methyl-N-phenethylamino)ethyl chloride for the 2-dimethylaminoethyl chloride in step (b) of Example 1 gives 2,3-dihydro - 2 - phenyl-5-[2-(N-methyl-N-phenethylamino)-ethyl]-1,5-benzoxazepin-4-one hydrochloride.

EXAMPLE 7

*2,3-dihydro-2-methyl-5-(2-dimethylaminoethyl)-1,5-benzoxazepin-4-one hydrochloride*

Following the procedure of Example 1 but substituting an equivalent amount of 2-methyl-2,3-dihydro-1,4-benzopyrone for the flavanone in step (a), gives 2,3-dihydro-2 - methyl-5-(2-dimethylaminoethyl)-1,5-benzoxazepin-4-one hydrochloride.

EXAMPLE 8

*2,3-dihydro-2-(p-methoxyphenyl)-5-(2-dimethylaminoethyl)-1,5-benzoxazepin-4-one hydrochloride*

Following the procedure of Example 1 but substituting an equivalent amount of 2-(p-methoxyphenyl)-2,3-dihydro-1,4-benzopyrone for the flavanone in step (a), gives 2,3 - dihydro-2-(p-methoxyphenyl)-5-(2-dimethylaminoethyl)-1,5-benzoxazepin-4-one hydrochloride.

EXAMPLE 9

*2,3-dihydro-2-(o-methoxyphenyl)-5-(2-dimethylaminoethyl)-1,5-benzoxazepin-4-one hydrochloride*

Following the procedure of Example 1 but substituting an equivalent amount of 2-(o-methoxyphenyl)-2,3-dihydro-1,4-benzopyrone for the flavanone in step (a) gives 2,3 - dihydro - 2-(o-methoxyphenyl)-5-(2-dimethylaminoethyl)-1,5-benzoxazepin-4-one hydrochloride.

EXAMPLE 10

*2,3-dihydro-5-(2-dimethylaminoethyl)-1,5-benzoxazepin-4-one hydrochloride*

Following the procedure of Example 1 but substituting an equivalent amount of 2,3-dihydro-1,4-benzopyrone for the flavanone in step (a) gives 2,3-dihydro-5-(2-dimethylaminoethyl)-1,5-benzoxazepin-4-one hydrochloride.

EXAMPLE 11

*2,3-dihydro-2-(p-chlorophenyl)-5-(2-dimethylaminoethyl)-1,5-benzoxazepin-4-one hydrochloride*

Following the procedure of Example 1 but substituting an equivalent amount of 2-(p-chlorophenyl)-2,3-dihydro-1,4-benzopyrone for the flavanone in step (a), gives 2,3-dihydro - 2 - (p-chlorophenyl)-5-(2-dimethylaminoethyl)-1,5-benzoxazepin-4-one hydrochloride.

EXAMPLE 12

*2,3-dihydro-2-(p-tolyl)-5-(2-dimethylaminoethyl)-1,5-benzoxazepin-4-one hydrochloride*

Following the procedure of Example 1 but substituting an equivalent amount of 2-(p-tolyl)-2,3-dihydro-1,4-benzopyrone for the flavanone in step (a), gives 2,3-dihydro-2-(p-tolyl)-5-(2 - dimethylaminoethyl)-1,5-benzoxazepin-4-one hydrochloride.

EXAMPLE 13

*2,3-dihydro-2-benzyl-5-(2-dimethylaminoethyl)-1,5-benzoxazepin-4-one hydrochloride*

Following the procedure of Example 1 but substituting an equivalent amount of 2-benzyl-2,3-dihydro-1,4-benzopyrone for the flavanone in step (a), gives 2,3-dihydro-2 - benzyl - 5 - (2 - dimethylaminoethyl)-1,5-benzoxazepin-4-one hydrochloride.

EXAMPLE 14

*2,3-dihydro-2-(α-furyl)-5-(2-dimethylaminoethyl)-1,5-benzoxazepin-4-one hydrochloride*

Following the procedure of Example 1 but substituting an equivalent amount of 2-(α-furyl)-2,3-dihydro-1,4-benzopyrone for the flavanone in step (a), gives 2,3-dihydro-2-(α-furyl) - 5 - (2-dimethylaminoethyl)-1,5-benzoxazepin-4-one hydrochloride.

EXAMPLE 15

*2,3-dihydro-2-(3-piperonyl)-5-(2-dimethylaminoethyl) 1,5-benzoxazepin-4-one hydrochloride*

Following the procedure of Example 1 but substituting an equivalent quantity of 2-(3-piperonyl)-2,3-dihydro-1,4-benzopyrone for the flavanone in step (a), 2,3-dihydro-2-(3-piperonyl) - 5 - (2-dimethylaminoethyl)-1,5-benzoxazepin-4-one hyrdochloride is obtained.

Similarly, by following the procedure of Example 1 but substituting 2-(γ-pyridyl)-2,3-dihydro-1,4-benzopyrone, 2-(α-pyridyl)-2,3-dihydro-1,4-benzopyrone and 2-(α-thienyl)-2,3-dihydro-1,4-benzopyrone for the flavanone in step (a), 2,3-dihydro-2-(γ-pyridyl) - 5 - (2 - dimethylaminoethyl)-1,5-benzoxazepin - 4 - one hydrochloride, 2,3-dihydro-2 - (α-pyridyl) - 5 - (2 - dimethylaminoethyl)-1,5-benzoxazepin-4-one hydrochloride, and 2,3-dihydro - 2 - (α - thienyl) - 5 - (2-dimethylaminoethyl)-1,5-benzoxazepin-4-one hydrochloride are obtained, respectively.

EXAMPLE 16

*2,3-dihydro-5-(2-morpholinoethyl)-2-phenyl-1,5-benzoxazepin-4-one hydrochloride*

Following the procedure of Example 1 but substituting an equivalent amount of 2-morpholinoethyl chloride for the 2-dimethylaminoethyl chloride in step (b), 2,3-dihydro-5-(2-piperidinoethyl) - 2-phenyl-1,5-benzoxazepin-4-one hydrochloride is obtained.

EXAMPLE 17

*2,3-dihydro-5-(2-piperidinoethyl)-2-phenyl-1,5-benzoxazepin-4-one hydrochloride*

Following the procedure of Example 1 but substituting an equivalent amount of 2-piperidinoethyl chloride for the 2-dimethylaminoethyl chloride in step (b), 2,3-dihydro-5 - (2 - morpholinoethyl) - 2 - phenyl - 1,5-benzoxazepin-4-one hydrochloride is obtained.

EXAMPLE 18

*2,3-dihydro-5-[3-(4-methyl-1-piperazinyl)propyl]-2-phenyl-1,5-benzoxazepin-4-one hydrochloride*

Following the procedure of Example 1 but substituting an equivalent amount of 1-methyl-4-(3-chloropropyl) piperazine for the 2-dimethylaminoethyl chloride in step (b), 2,3-dihydro-5-[3-(4-methyl-1-piperazinyl)propyl]-2-phenyl-1,5-benzoxazepin-4-one hydrochloride is obtained.

Similarly, by following the procedure of Example 1 but substituting 1-allyl-4-(2-chloroethyl)piperazine, 1-phenethyl-4-(2-chloroethyl)piperazine and 1-cinnamyl-4-(3-chloropropyl)piperazine for 2-diethylaminoethyl chloride in step (b), 2,3-dihydro-5-[2-(4-allyl-1-piperazinyl) ethyl-2-phenyl-1,5-benzoxazepin-4-one hydrochloride, 2,3-dihydro-5-[2-(4-phenethyl-1-piperazinyl)ethyl] - 2 - phenyl-1,5-benzoxazepin-4-one hydrochloride and 2,3-dihydro-5-[3-(4 - cinnamyl - 1 - piperazinyl)propyl]-2-phenyl-1,5-benzoxazepin-4-one hydrochloride are obtained, respectively.

EXAMPLE 19

*2,3-dihydro-5-(2-diethylaminoethyl)-2-ethyl-1,5-benzoxazepin-4-one hydrochloride*

Following the procedure of Example 1 but substituting an equivalent amount of 2-ethyl-2,3-dihydro-1,4-benzopyrone for the flavanone in step (a), 2,3-dihydro-5-(2-diethylaminoethyl)-2-ethyl-1,5-benzoxazepin-4-one hydrochloride is obtained.

EXAMPLE 20

*7-chloro-2,3-dihydro-2-phenyl-5-(2-diethylaminoethyl) 1,5-benzoxazepin-4-one hydrochloride*

Following the procedure of Example 1 but substituting an equivalent amount of 6-chloroflavanone for the flavanone in step (a), 7-chloro-2,3-dihydro-2-phenyl-5-(2-diethylaminoethyl)-1,5 - benzoxazepin-4-one hydrochloride is obtained.

EXAMPLE 21

*7-methyl-2,3-dihydro-2-phenyl-5-(2-diethylaminoethyl)-1,5-benzoxazepin-4-one hydrochloride*

Following the procedure of Example 1 but substituting an equivalent amount of 6-methylflavanone for the flavanone in step (a), 7-methyl-2,3-dihydro-2-phenyl-5-(2-diethylaminoethyl)-1,5 - benzoxazepin-4-one hydrochloride is obtained.

EXAMPLE 22

*7-methoxy-2,3-dihydro-2-phenyl-5-(2-diethylaminoethyl)-1,5-benzoxazepin-4-one hdrochloride*

Following the procedure of Example 1 but substituting an equivalent amount of 6-methoxy flavanone for the flavanone in step (a), 7-methoxy-2,3-dihydro-2-phenyl-5-(2-diethylaminoethyl)-1,5-benzoxazepin-4-one hydrochloride is obtained.

EXAMPLE 23

*7-(trifluoromethyl)-2,3-dihydro-2-phenyl-5-(2-diethylaminoethyl)-1,5-benzoxazepin-4-one hydrochloride*

Following the procedure of Example 1 but substituting an equivalent amount of 6-(trifluoromethyl)flavanone for the flavanone in step (a), 7-(trifluoromethyl)-2,3-dihydro-2 - phenyl - 5 - (2-diethylaminoethyl)-1,5-benzoxazepin-4-one hydrochloride is obtained.

The invention may be variously otherwise embodied within the scope of the appended claims.

What is claimed is:

1. A compound selected from the group consisting of bases of the formula

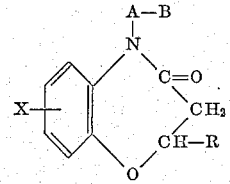

and pharmaceutically-acceptable acid addition salts thereof, wherein X is selected from the group consisting of hydrogen, lower alkyl, lower alkoxy, amino, nitro, halo and trifluoromethyl; R is selected from the group consisting of hydrogen, lower alkyl, X-substituted phenyl lower alkyl, X-substituted phenyl, furyl, thienyl, pyridyl and piperonyl; A is lower alkylene; and B is a basic nitrogen-containing radical of less than twelve carbon atoms.

2. 2,3-dihydro-2-phenyl-5-di(lower alkyl)amino(lower alkyl)-1,5-benzoxazepin-4-one.

3. A pharmaceutically-acceptable acid-addition salt of the compound of claim 2.

4. 2,3-dihydro-2-phenyl - 5 - (2 - dimethylaminoethyl)-1,5-benzoxazepin-4-one hydrochloride.

5. 2,3-dihydro-2-phenyl - 5 - (3-dimethylaminopropyl)-1,5-benzoxazepin-4-one hydrochloride.

6. A compound of the formula

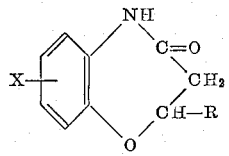

wherein X is selected from the group consisting of hydrogen, lower alkyl, lower alkoxy, amino, nitro, halo and trifluoromethyl; and R is selected from the group consisting of hydrogen, lower alkyl, X-substituted phenyl lower alkyl, X-substituted phenyl, furyl, thienyl, pyridyl and piperonyl.

7. 2,3-dihydro-2-phenyl-1,5-benzoxazepin-4-one.

8. A process for preparing a compound of the formula:

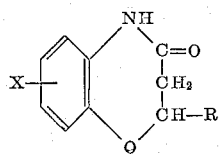

wherein X is selected from the group consisting of hydrogen, lower alkyl, lower alkoxy, amino, nitro, halo and trifluoromethyl; and R is selected from the group consisting of hydrogen, lower alkyl, X-substituted phenyl lower alkyl, X-substituted phenyl, furyl, thienyl, pyridyl and piperonyl, which comprises reacting a corresponding compound of the formula

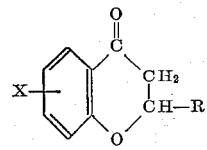

wherein X and R are as above defined, with hydrazoic acid.

9. A process for preparing 2,3-dihydro-2-phenyl-1,5-benzoxazepin-4(5H)-one, which comprises reacting flavanone with hydrazoic acid.

References Cited by the Examiner
UNITED STATES PATENTS
3,075,967   1/1963   Krapcho _____ 260—239.3

OTHER REFERENCES

Noller: "Chemistry of Organic Compounds," 2nd ed., p. 272, Saunders (1957).

WALTER A. MODANCE, *Primary Examiner.*

JOHN D. RANDOLPH, *Examiner.*

ROBERT T. BOND, *Assistant Examiner.*